Dec. 25, 1962     D. H. POLZIN     3,070,267
FERTILIZER DISTRIBUTOR SPOUT SUPPORT
Original Filed Sept. 2, 1958

*INVENTOR.*
DONALD H. POLZIN
BY
*ATTORNEYS*

3,070,267
FERTILIZER DISTRIBUTOR SPOUT SUPPORT
Donald H. Polzin, Horicon, Wis., assignor to Deere & Company, Moline, Ill., a corporation of Delaware
Original application Sept. 2, 1958, Ser. No. 758,376. Divided and this application May 18, 1960, Ser. No. 30,015
2 Claims. (Cl. 222—567)

This application is a division of my copending application, Ser. No. 758,376, filed September 2, 1958, for Fertilizer Distributor With Level Responsive Flow Adjustment.

The present invention relates generally to agricultural implements and more particularly to fertilizer distributors and the like.

The object and general nature of this invention is the provision of a new and improved fertilizer distributor in which fertilizer is distributed from a hopper that is provided with a plurality of openings through which fertilizer is discharged and new and improved means for detachably securing spouts over said discharge openings.

More specifically, it is a feature of this invention to provide spout attaching means for a fertilizer distributor or the like in which each spout is releasably attached to the distributor hopper by a spring clip and a shoulder rivet that slips into a keyhole slot in the hopper. Additionally, according to this invention, the spring clip is provided with detent means or the like that is located so that when the spout is in proper position the detent means projects into the larger portion of the keyhole slot and thus holds the entire spout assembly in place, yet the latter may readily be removed when desired.

Still further another feature of this invention is the provision of a spout-holding spring biased so as to hold the spout snugly against the associated part.

These and other objects and advantages of the present invention will be apparent to those skilled in the art after a consideration of the following detailed description taken in conjunction with the accompanying drawings, in which.

Figure 1:
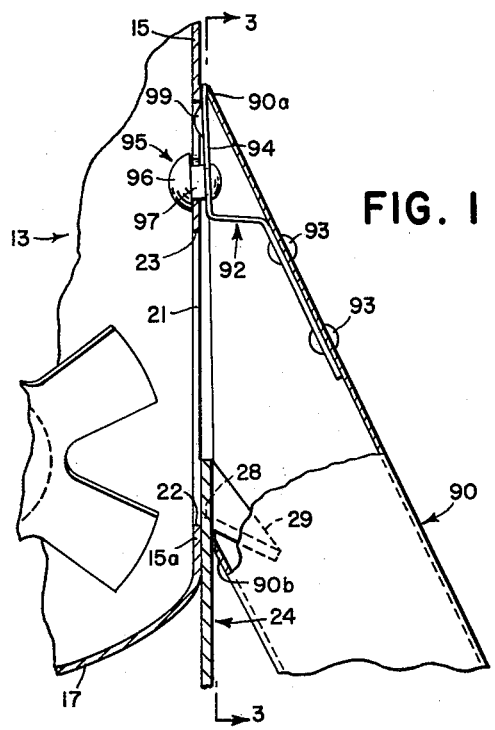
FIG. 1 is a fragmentary transverse sectional view taken through the hopper of the fertilizer distributor in which the principles of the present invention have been incorporated.
Figure 2:
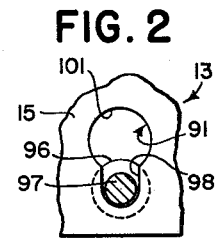
FIG. 2 is a fragmentary front elevation of a fertilizer hopper in which the spout arrangement of this invention has been incorporated.

Referring first to FIG. 1, the principles of this invention have been shown as incorporated in a fertilizer distributor that may be carried by the rear portion of a grain drill. The distributor includes a fertilizer hopper 13 having front and rear walls spaced apart and a bottom wall means. The front wall is indicated at 15 and the bottom wall at 17. The bottom wall 17 forms a rounded portion that is joined smoothly with and serves as an integral part of the rear wall means. The lower portion of the front wall means, as indicated at 15a is disposed generally vertically and is provided with plurality of outlets 21, each having a lower edge 22 and an upper edge 23. The openings 21 are spaced apart longitudinally of the hopper 13 and are disposed well above the bottom 17 of the hopper.

Disposed along the apertured front wall means 15a is an elongated substantially flat vertically adjustable slide or gate 24 that lies substantially flat against the vertical forward or outer face of the front wall section 15a, being held in this position by a plurality of springs (not shown) that not only hold the slide or gate 24 against the outer face of the front wall section 15a but also accommodate vertical adjusting movement of the slide or gate 24. At each opening 21 the slide or gate has a discharge opening in the form of a notch or opening 28 and an associated curved lip 29. The gate 24 may be raised and lowered by any suitable means. The lower the position of the gate 24 the greater the amount of fertilizer that is delivered over the upper edge 28 of the gate, and the higher the position of the gate the smaller the amount of fertilizer thus delivered. It will be seen, therefore, that in a fertilizer distributor of this type, there is maintained in the lower portion of the hopper a quantity of fertilizer that is constantly available to fall under the action of gravity over the gate 24 and which is constantly replaced by fertilizer moving downwardly into the lower portion of the hopper 13.

Fertilizer that discharges over the lips or notches 29 in the gate 24 is directed downwardly by spouts 90.

Each of the spouts includes a tubular part that at its upper or open end 90a is shaped to fit close against the hopper wall 15a and at the lower portion 90b of the upper tube opening each spout is shaped to fit close against the slide or gate 24 below the associated lip 29.

Figure 3:
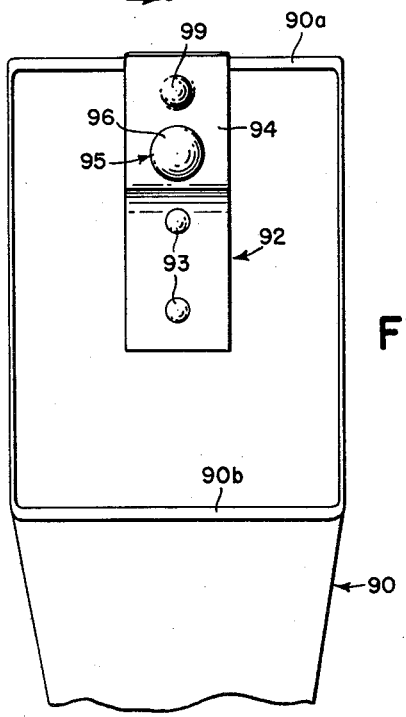
FIG. 3 is a view looking at the open upper end of the spout from the plane of the line 3—3 of FIG. 1, showing the spout detached from the associated hopper.

The wall 15a has a keyhole slot 91 formed therein with the larger end upward. A spring clip 92 shaped as shown in FIGS. 1 and 3 is riveted, as at 93, to the upper end of the tube 90. The spring clip 92 is a generally Z-shaped part, one leg being apertured to receive the rivets 93. The other leg 94 of the clip 92 carries a shoulder rivet 95 having a head 96 and a shoulder portion 97, the diameter of which is such that said portion 97 may be passed into the narrow portion 98 of the keyhole slot 91. An integral boss or projection 99 is formed on or carried by the end portion of the clip leg 94 and is spaced from the rivet 95 so that when the head 96 is passed through the larger part of the keyhole slot 91 and the narrow portion 97 of the rivet passed into the narrow part 98 of the slot 91 the boss or projection 99 snaps into the larger portion 101 of the slot 91 and thereby serves to hold the head 96 of the rivet in behind the narrow part of the keyhole slot, thus locking the spout to the hopper and holding the spout against accidental displacement. The spring clip 92 is shaped so that the resiliency of or tension in the clip 92 holds the lower edge 90b of the spout opening against the outer face of the slide or gate 24, thus preventing leakage of fertilizer at this point.

While I have shown and described above the preferred structure in which the principles of the present invention have been incorporated, it is to be understood that my invention is not to be limited to the particular details, shown and described above, but, that in fact, widely different means may be employed in the practice of the broader aspects of my invention.

What I claim, therefore, and desire to secure by Letters Patent is:

1. A fertilizer distributor comprising a hopper having a generally vertical wall provided with a discharge opening therein and a keyhole slot above said discharge opening, said keyhole slot having a lower narrow portion and an upper larger portion, a spout adapted to fit over said opening and to extend downwardly therefrom, an attaching member fixed to the upper portion of said spout and having a lower part fixed to said spout and an upper part carrying a headed member having a head adapted to be passed through said larger keyhole portion and a shoulder portion dimensioned to pass into the narrow portion of said keyhole slot by downward movement of said spout and said attaching member, and a projection on said attaching member spaced from and above said headed member and adapted to enter the upper larger portion of the keyhole slot when the shoulder portion of the headed member is disposed within the narrow portion and yieldingly retain said headed member in position.

2. The invention set forth in claim 1 in which the attaching member is resilient and normally holds a lower edge of the spout against said vertical wall when said headed member is engaged in said keyhole slot.

References Cited in the file of this patent

UNITED STATES PATENTS

| | | |
|---|---|---|
| 721,404 | Wege | Feb. 24, 1903 |
| 946,969 | Laing | Jan. 18, 1910 |
| 1,087,195 | Smith | Feb. 17, 1914 |
| 1,254,094 | Vogt | Jan. 22, 1918 |
| 1,261,836 | Martin | Apr. 9, 1918 |